(12) United States Patent
Green et al.

(10) Patent No.: US 12,355,118 B2
(45) Date of Patent: Jul. 8, 2025

(54) SMART HYDROGEN STORAGE TANKS FOR FUEL CELL APPLICATIONS

(71) Applicant: CUMMINS INC, Columbus, IN (US)

(72) Inventors: Jeffrey A. Green, Columbus, IN (US); Jacob A. Brown, Columbus, IN (US); Vivek Anand Sujan, Columbus, IN (US); Brian K. Landes, Seymour, IN (US); Jeffrey W. Rinker, Trafalgar, IN (US); Archit N. Koti, Columbus, IN (US); Vinayak Mandavkar, Columbus, IN (US)

(73) Assignee: CUMMINS INC, Columbus, IN (US)

( * ) Notice: Subject to any disclaimer, the term of this patent is extended or adjusted under 35 U.S.C. 154(b) by 903 days.

(21) Appl. No.: 17/503,074

(22) Filed: Oct. 15, 2021

(65) Prior Publication Data

US 2022/0123332 A1    Apr. 21, 2022

Related U.S. Application Data

(60) Provisional application No. 63/093,009, filed on Oct. 16, 2020.

(51) Int. Cl.
| | | |
|---|---|---|
| *H01M 8/04089* | (2016.01) | |
| *H01M 8/04082* | (2016.01) | |
| *H01M 8/0432* | (2016.01) | |
| *H01M 8/0438* | (2016.01) | |

(52) U.S. Cl.
CPC ... *H01M 8/04089* (2013.01); *H01M 8/04201* (2013.01); *H01M 8/04373* (2013.01); *H01M 8/04425* (2013.01); *H01M 2250/20* (2013.01)

(58) Field of Classification Search
CPC ......... H01M 8/04201; H01M 8/04089; H01M 8/04373; H01M 8/04425; H01M 2250/20
See application file for complete search history.

(56) References Cited

U.S. PATENT DOCUMENTS 8,492,047 B2    7/2013    Hwang

FOREIGN PATENT DOCUMENTS

| CN | 106876749 | | 6/2017 |
|---|---|---|---|
| CN | 108232242 | | 6/2018 |
| CN | 208069460 | | 11/2018 |
| CN | 110701482 | * | 1/2020 |
| CN | 110775871 | | 2/2020 |
| CN | 110789333 | | 2/2020 |
| DE | 4434829 | | 4/1996 |
| KR | 2008-0048850 | * | 6/2008 |

OTHER PUBLICATIONS

English translation of KR Publication 2008-0048850, Jun. 2008.*

* cited by examiner

*Primary Examiner* — Brittany L Raymond
(74) *Attorney, Agent, or Firm* — Barnes & Thornburg LLP

(57) ABSTRACT

A hydrogen storage tank of a vehicle includes a housing defining an inlet/outlet opening, a control assembly extending into the housing through the opening and comprising a plurality of sensors, and a controller configured to receive signals from the plurality of sensors. The controller of the hydrogen storage tank is configured to, in response to a request for a handshake signal, initiate sending the handshake signal, and in response to the vehicle being started, initiate periodically sending data indicating parameter values received from the plurality of sensors.

19 Claims, 4 Drawing Sheets

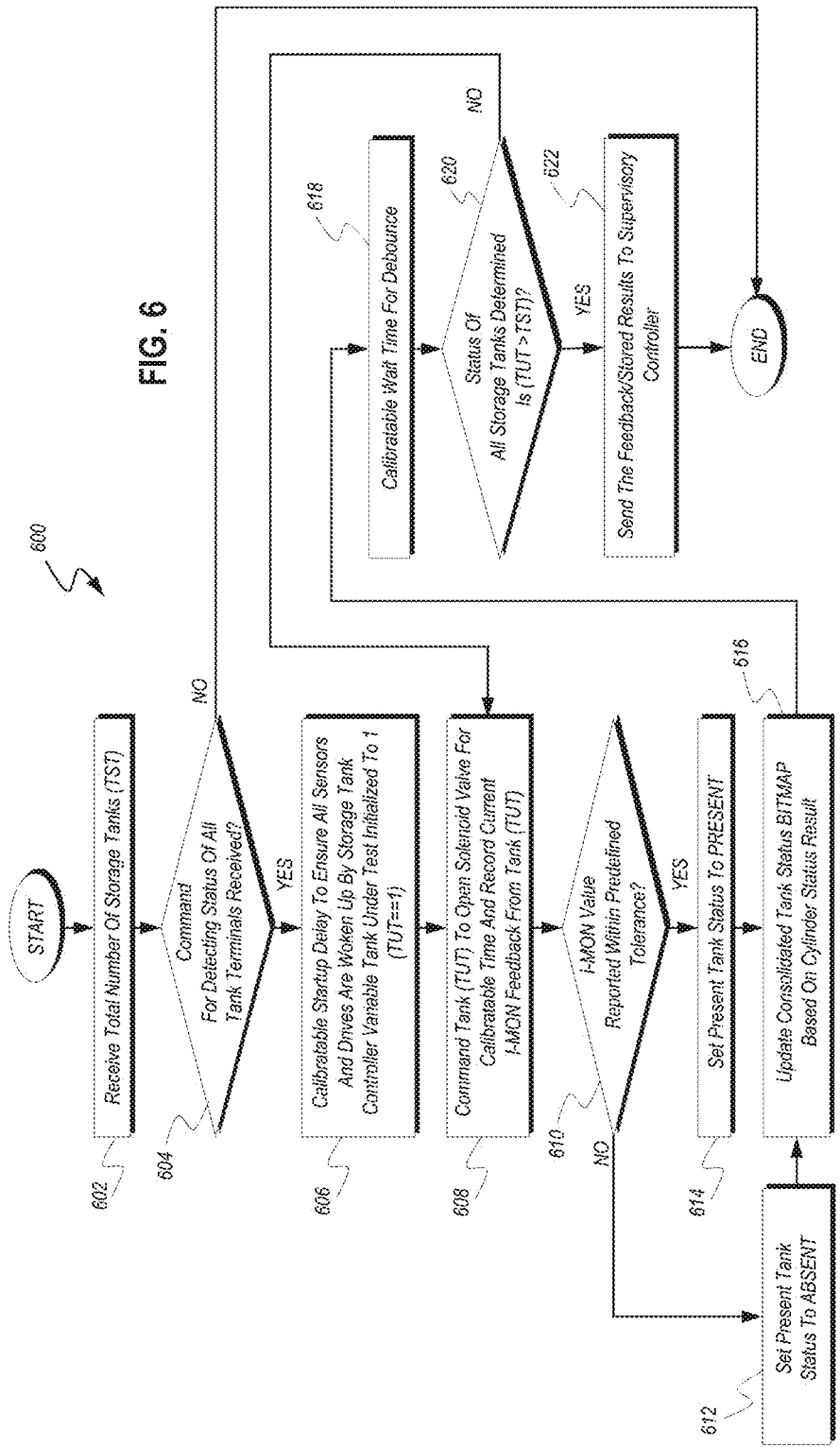

SMART HYDROGEN STORAGE TANKS FOR FUEL CELL APPLICATIONS

CROSS-REFERENCE TO RELATED APPLICATIONS

This application claims priority under 35 U.S.C. § 119(e) to U.S. Provisional Application Ser. No. 63/093,009 filed on Oct. 16, 2020, the entire disclosure of which is incorporated herein by reference.

TECHNICAL FIELD

The present disclosure generally relates to systems and methods for controlling an arrangement of hydrogen storage tanks.

BACKGROUND

Fuel cell vehicles use hydrogen or hydrogen-rich gas to power an electric motor. The fuel cell stack may generate electricity in the form of direct current (DC) from electrochemical reactions that take place in the fuel cells. A fuel processor converts fuel into a form usable by the fuel cell. If the system is powered by a hydrogen-rich, conventional fuel, such as methanol, gasoline, diesel, or gasified coal, a reformer may convert hydrocarbons into a gas mixture of hydrogen and carbon compounds, or reformate. The reformate may then be converted to carbon dioxide, purified and recirculated back into the fuel cell stack.

SUMMARY

A hydrogen storage tank of a vehicle, the hydrogen storage tank includes a housing defining an inlet/outlet opening, a control assembly extending into the housing through the opening and comprising a plurality of sensors, and a controller configured to receive signals from the plurality of sensors. The controller is configured to, in response to a request for a handshake signal, initiate sending the handshake signal, and in response to the vehicle being started, initiate periodically sending data indicating parameter values received from the plurality of sensors.

A method for a vehicle includes, in response to a handshake request, by a controller of the vehicle, initiating sending a handshake signal, the controller communicatively coupled to a control system of a hydrogen storage tank, the control system comprising a plurality of sensors, and in response to a status request, initiating periodically sending data indicating parameter values received from the plurality of sensors.

A vehicle includes a plurality of hydrogen storage tanks, each storage tank including a plurality of sensors, a smart tank controller associated with each of the plurality of hydrogen storage tanks, each smart tank controller communicatively coupled to the plurality of sensors of the hydrogen storage tank associated with the smart storage controller, and a hydrogen storage controller communicatively connected to each of the plurality of smart tank controllers and configured to send a handshake request thereto, wherein the hydrogen storage controller determines a total available hydrogen capacity value of the vehicle based on a number of the hydrogen storage tanks connected to an on-board communication network and capacity of each of the connected hydrogen storage tanks, and wherein the number of the connected hydrogen storage tanks corresponds to a number of handshake signals received in response to the request.

A system for a vehicle includes a hydrogen storage controller comprising a solenoid valve drive terminal and a current monitoring terminal, the terminals configured to electrically and communicatively couple the controller to a control system of a hydrogen storage tank. The hydrogen storage controller is configured to, in response to a request to determine a total available hydrogen capacity value of the vehicle, energize the solenoid valve drive terminal and monitor, during the energizing, current flow at the current monitoring terminal, determine the total available hydrogen capacity value of the vehicle based on the current flow, and cause the vehicle to be operated based on the determined the total available hydrogen capacity value.

BRIEF DESCRIPTION OF THE DRAWINGS

The detailed description particularly refers to the following figures, in which:

FIG. 6 is a block diagram illustrating an example process flow for monitoring a current output terminal of the storage tank;

DETAILED DESCRIPTION

Figure 2:
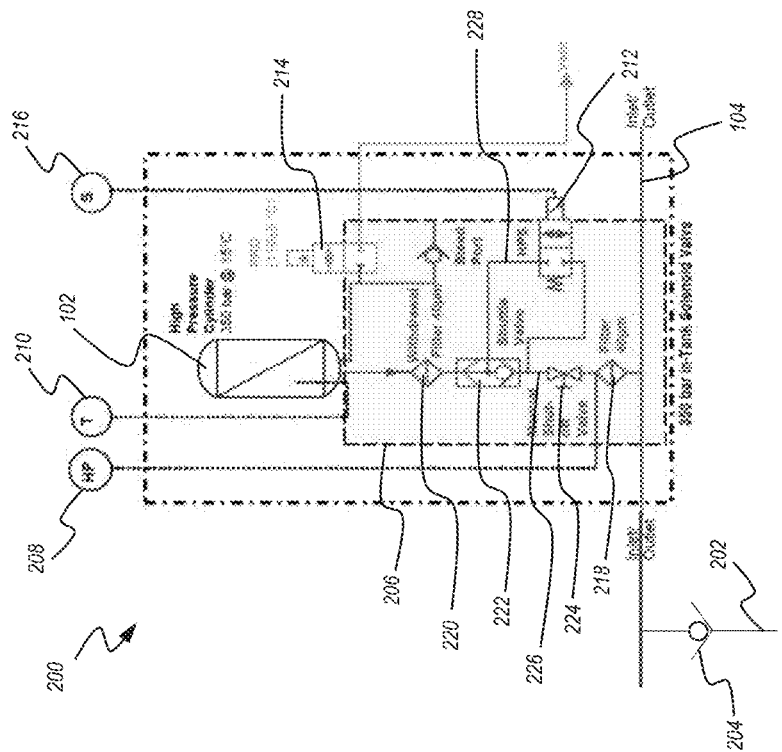
FIG. 2 is a block diagram illustrating an example control system for a storage tank of the hydrogen storage system of FIG. 1.

While the concepts of the present disclosure are susceptible to various modifications and alternative forms, specific exemplary embodiments are been shown by way of example in the drawings and will be described. It should be understood, however, that there is no intent to limit the concepts of the present disclosure to the particular forms disclosed; on the contrary, the intention is to cover all modifications, equivalents, and alternatives falling within the spirit and scope of the invention as defined by the appended claims.

References in the specification to "one embodiment," "an embodiment," "an illustrative embodiment," etc., indicate that the described embodiment may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C).

Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Power generation systems and methods of the present disclosure may include a battery, an engine, and/or a fuel cell system. Fuel cell systems comprise one or more, multiple, and/or a plurality of fuel cells, fuel cell stacks, and/or fuel cell modules in a system. In some embodiments, the power generation system may comprise an engine, such as an internal combustion engine, a diesel engine, or a hydrogen powered engine, etc. In other embodiments, the present methods and systems do not comprise an engine or a battery.

A hydrogen storage tank system for power generation systems, such as fuel cell applications may comprise an N number of hydrogen storage tanks, e.g., hydrogen ($H_2$) storage tanks. In a traditional hydrogen storage system, a single storage tank controller provides drive signals for each of a plurality of hydrogen storage tanks connected thereto. In an example, the tank storage controller provides to each storage tank multiple input/output (I/O) signals, such as, but not limited to, signals to power and control each of a tank pressure sensor, a tank temperature sensor, and a tank solenoid valve, where each signal is delivered via its own terminal connection.

Adding or removing one or more hydrogen storage tanks in a traditional hydrogen storage control system is challenging. For example, a software application update and/or recalibration of the storage tank controller may be necessary to ensure that the sets of signals are delivered to the newly connected storage tanks. As another example, when one or more storage tanks are disconnected, reprogramming and/or recalibrating the storage tank controller may be necessary to prevent the storage tank controller from incorrectly identifying open terminal connections as open load faults.

A hydrogen storage controller of the present disclosure is configured to monitor a current output of a solenoid of a storage tank. For example, each storage tank includes a current output terminal electrically and communicatively coupled to a corresponding terminal of the hydrogen storage controller. In response to a request to determine a number of storage tanks connected to the hydrogen storage controller, the hydrogen storage controller is configured to sequentially command to turn ON the corresponding solenoid of each of the storage tanks. The hydrogen storage controller monitors current flow at the current output terminal of the storage tank during the command to determine whether the storage tank is presently connected to the storage controller.

Each storage tank of the present disclosure may be equipped with a dedicated smart tank controller configured to provide the necessary drive signals and perform storage tank diagnostics. The smart tank controller communicates with the storage tank controller using an on-board communication network. Moreover, because each smart tank controller communicates with the storage tank controller using an on-board network connection, a greater number of storage tanks may be connected to a given storage tank controller.

Figure 1:
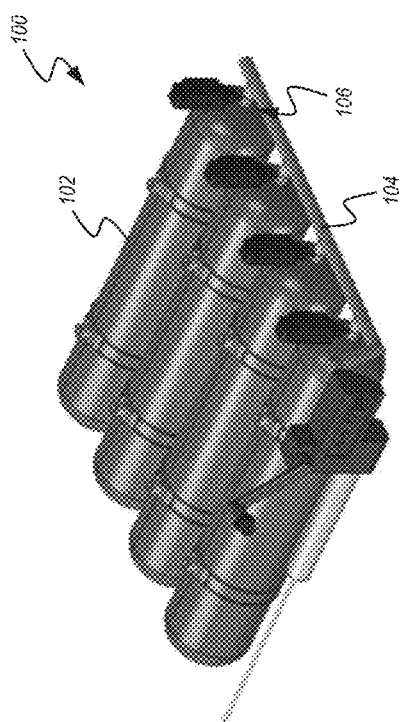
FIG. 1 is a block diagram illustrating an example hydrogen storage system.

FIG. 1 illustrates an example hydrogen fuel storage system 100 comprising a plurality of hydrogen storage tanks 102. In an example, each tank 102 comprises a cylindrical housing 104 defining an inlet and outlet opening 106. In some instances, each of the hydrogen storage tanks 102 has hydrogen storage capacity equal to that of other hydrogen tanks 102 of the system 100. In other instances, corresponding hydrogen storage capacities of one or more of the hydrogen storage tanks of the hydrogen storage tank system may be different.

FIG. 2 illustrates an example control system 200 of the hydrogen fuel storage system 100 comprising the plurality of hydrogen storage tanks 102, including one or more single hydrogen storage tanks 102. The hydrogen storage tanks 102 may receive fuel via a fuel inlet 202 by way of a check valve 204 configured to prevent backflow. While illustrated in FIG. 2 as being located entirely outside the hydrogen storage tank 102, at least a portion of an integrated valve assembly 206 extends into the hydrogen storage tank 102, e.g., via the opening 106, and is configured to direct the flow of hydrogen into and out of the hydrogen storage tank 102. The integrated valve assembly 206 is configured to regulate pressure of the gas flowing into and out of the hydrogen storage tank 102.

The integrated valve assembly 206 includes a pressure transducer 208, a temperature sensor 210, a solenoid valve 212, a pressure relief device 214, and a solenoid drive and return circuit 216. The pressure transducer 208 and the temperature sensor 210, respectively, provide signals indicative of a pressure and a temperature of the gas in the hydrogen storage tank 102. Signals from the transducer 208 and the sensor 210 are also used to control the solenoid valve 212. The solenoid drive and return circuit 216 monitors and controls operation of the solenoid valve 212. The solenoid drive and return circuit 216 shuts off flow from the hydrogen storage tank 102 when the pressure in the hydrogen storage tank 102 is less than a predetermined pressure level (e.g., a first threshold pressure). Maintaining a predefined pressure threshold, or range of pressure values, within the hydrogen storage tank 102 allows controlling temperature of the gas during filling or venting of the hydrogen storage tank 102.

The solenoid valve 212 also functions as an excess flow shut-off valve such that the flow of gas from the hydrogen storage tank 102 is cut off in response to a pressure being greater than a predefined threshold (e.g., a second threshold pressure). A pressure relief device 214 releases gas from the hydrogen storage tank 102 to the outside if the temperature rises above a predetermined threshold.

Gas flow from the hydrogen storage tank 102 to the fuel cells (not illustrated) can be controlled using the solenoid valve 212, which is normally closed and only permits a flow of gas when electrically activated. As described in reference to at least FIG. 3, a hydrogen storage controller 302 may comprise a current control switch 216, which may be configured to activate and deactivate the solenoid valve 212 to provide gas flow to the propulsion system, e.g., engine and/or motor. The integrated valve assembly 206 may also include one or more of an inlet hydrogen filter 218, a withdrawal hydrogen filter 220, a shuttle valve 222, and a manual shut-off valve 224. The shuttle valve 222 may operate to open and close the flow of gas into the hydrogen storage tank 102. The shuttle valve 222 includes a valve body movable under differential pressure to permit a flow of gas through a main flow passage 226, e.g., during refueling, and to re-direct the flow of gas toward the fuel cells via a bypass passage 228 controlled by the solenoid valve 212. The manual shut-off valve 224 is an external hand valve for manually isolating, in addition to the solenoid valve 212, the hydrogen storage tank 102 during fueling or venting.

Figure 3:
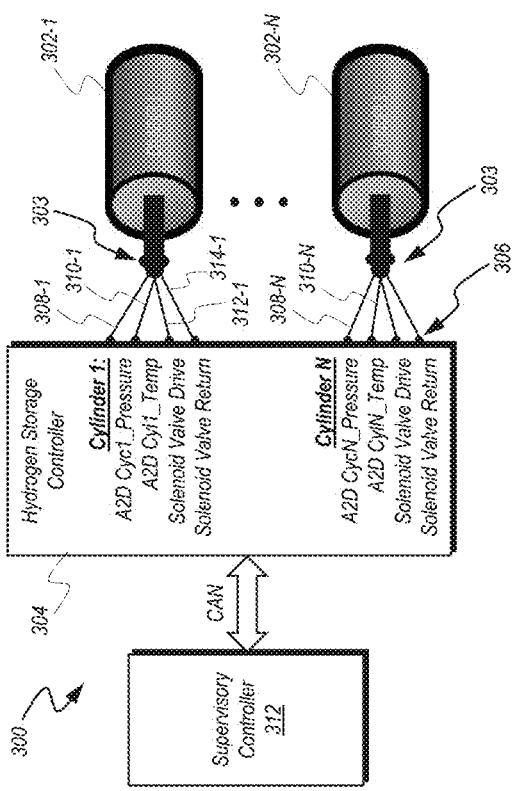
FIG. 3 is a block diagram illustrating an example hydrogen storage controller in communication with the control system of FIG. 2.

FIG. 3 illustrates an example hydrogen storage system 300. The storage system 300 comprises any number of storage tanks 302-1 to 302-N (i.e., "N" can be any number). Each storage tank 302 includes a control system, such as the control system described in reference to at least FIG. 2. In one example, each storage tank 302 comprises terminals 303 for a plurality of sensors, such as, but not limited to, the temperature sensor 310, pressure transducer 308, the solenoid drive 312, and/or the solenoid return 314 connect to corresponding terminals 306 of the hydrogen storage controller 304.

The hydrogen storage controller 304 transmits a separate signal to activate a solenoid valve of each of the plurality of the hydrogen storage tanks 302. In an example, the hydrogen storage controller 304 energizes a corresponding solenoid valve drive terminal 314 of each of the plurality of hydrogen storage tanks 302.

The hydrogen storage controller 304 may be communicatively coupled to a supervisory controller 312. The hydrogen storage controller 304 may be configured to transmit detected hydrogen storage capacity values of each of the hydrogen storage tanks 302 and/or a total hydrogen storage capacity value available. In an example, each hydrogen storage tank 302 includes a predefined amount M of hydrogen storage capacity. The hydrogen storage controller 304 may be configured to determine a total hydrogen storage capacity of the hydrogen storage tanks 302 according to Equation (1), such that:

$$\text{Total\_Hydrogen\_Storage\_Capacity} = N*M. \quad (1)$$

In such a system, when adding or removing one or more hydrogen storage tanks from the system there is a need to ensure all the physical drives are provided correctly. For example, to add an additional storage tank 302, additional wiring between the hydrogen storage controller 304 and the newly added tank 302 is needed to provide the drive signals from the hydrogen storage controller 304 to the solenoid valve. As another example, to remove a given storage tank 302 from the hydrogen storage system 300, calibrations and/or application software of the hydrogen storage controller 304 may need to be updated to prevent occurrence of open load faults.

Figure 4:
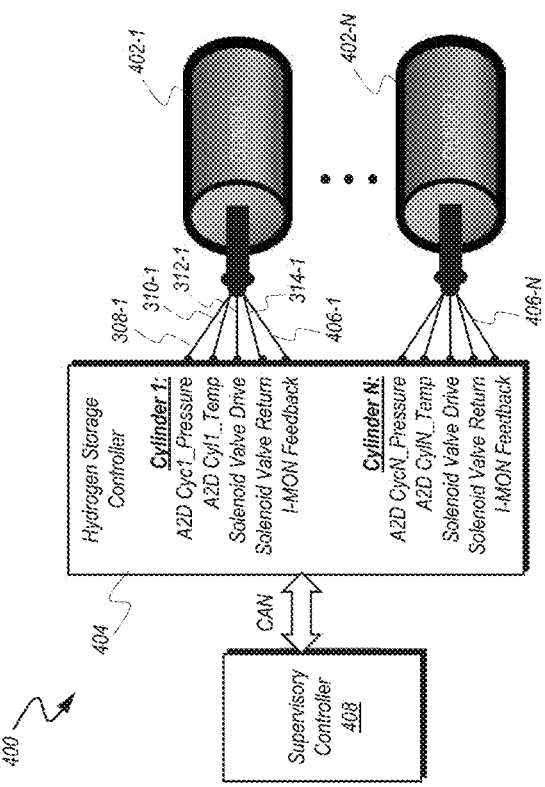
FIG. 4 is a block diagram illustrating a hydrogen storage controller for monitoring a current output terminal of the storage tank.

FIG. 4 illustrates an example implementation 400 of a hydrogen storage controller 404 configured to identify a number of hydrogen storage tanks 402 connected to the hydrogen storage controller 404. In one example, the hydrogen storage controller 404 may identify a number of hydrogen storage tanks 402 connected thereto based on a current feedback signal received from the solenoid drive of each of the hydrogen storage tanks 402. The hydrogen storage controller 404 issues the sequential commands in response to a request to determine a number of hydrogen storage tanks 402 connected. In some instances, the request to determine the number of connected hydrogen storage tanks 402 may be activated by a service technician, e.g., using a service tool. Other possibilities for issuing the request are also contemplated.

While issuing the command to turn on a solenoid of a given hydrogen storage tank 402, the hydrogen storage controller 404 monitors and records a current feedback signal from the solenoid valve of the hydrogen storage tank 402 to determine a presence or absence of the tank 402. In one example, the hydrogen storage controller 404 determines whether the hydrogen storage tank 402 is present, i.e., the hydrogen storage tank 402 is connected to the hydrogen storage controller 404, or absent, i.e., the hydrogen storage tank 402 is disconnected from the hydrogen storage controller 404 based on current value detected by the hydrogen storage controller 404 during the command to turn on the solenoid.

As one example, the hydrogen storage controller 404 issues a command to turn ON the solenoid of a first hydrogen storage tank 402-1, e.g., by energizing the solenoid valve drive terminal 314-1 of the first hydrogen storage tank 402-1, and monitors, during the command, current flow at the I-MON current feedback terminal 406-1 of the first hydrogen storage tank 402-1, e.g., by monitoring the I-MON current feedback terminal 406-1. The hydrogen storage controller 404 determines that the first hydrogen storage tank 402-1 is present, i.e., that the first hydrogen storage tank 402-1 is connected to the hydrogen storage controller 404, in response to current level at the current feedback terminal 406-1 of the first hydrogen storage tank 402-1 exceeds a predefined threshold. The hydrogen storage controller 404 determines that the first hydrogen storage tank 402-1 is absent, i.e., that the first hydrogen storage tank 402-1 is disconnected from the hydrogen storage controller 404, in response to current level at the current feedback terminal 406-1 of the first hydrogen storage tank 402-1 being less than a predefined threshold. The hydrogen storage controller 404 may be configured to repeat the command and monitor process for each of the terminal sets that may be connected to a hydrogen storage tank 402.

Accordingly, the hydrogen storage controller 404 analyzes recorded current readings to determine whether the hydrogen storage tank 402 is connected to the system and updates a state of a power down variable or PowerDown variable, or a variable, parameter, or instructions to power down or shut down the system, associated with the tank 402 to a corresponding state (e.g., PRESENT or ABSENT). In some instances, the hydrogen storage controller 404 uses the PowerDown variable to disable related controls and drives for the one or more terminal sets determined not to have a connected tank 402. The hydrogen storage controller 404 provides one or more operating parameters to the supervisory controller 408 for the hydrogen storage tanks 402 having a PRESENT state, such as, but not limited to, a total (cumulative) and/or individual storage mass, pressure of each of the tanks 402 having a PRESENT state, temperature value of the tanks 402 having a PRESENT state, and a status of a corresponding solenoid of each of the hydrogen storage tanks 402. The hydrogen storage controller 404 may be configured to masks on-board diagnostic (OBD) faults reported by one or more terminals sets having an ABSENT state, e.g., terminals not having tanks 402 connected thereto.

The hydrogen storage controller 404 may be communicatively coupled to a supervisory controller 408. The hydrogen storage controller 404 may be configured to transmit, to the supervisory controller 408, detected hydrogen storage capacity values of each of the hydrogen storage tanks 402 and/or a total hydrogen storage capacity value available.

Figure 5:
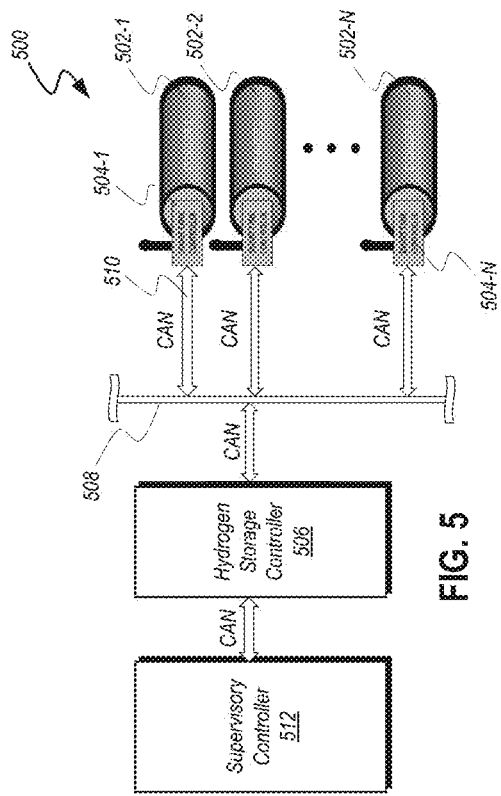
FIG. 5 is a block diagram illustrating a smart tank controller of the hydrogen storage system in accordance with the present disclosure.

FIG. 5 illustrates an example implementation 500 of smart storage tanks 502 including smart tank controllers 504. In particular, a first smart storage tank 502-1 is communicatively coupled to a first smart tank controller 504-1 and so on, such that an N-th smart storage tank 502-N is communicatively coupled to an N-th smart tank controller 504-N. As described in reference to at least FIG. 8, the smart tank controller 504 may comprise a processor, memory, data storage devices, and other components to perform operations as described herein.

The smart tank controller 504 may be configured to store a storage tank identifier of the smart storage tank 502 and a storage tank type of the smart storage tank 502. Each smart tank controller 504 is configured to monitor and control operation of the corresponding smart storage tank 502 such as, but not limited to, a present pressure of the smart storage tank 502, a present temperature of the smart storage tank 502, a storage mass of the smart storage tank 502, a present estimated storage mass of the smart storage tank 502, a solenoid status of a solenoid of the smart storage tank 502, and a diagnostic bitmap of the smart storage tank 502. In an example, the smart tank controller 504 is configured to perform circuit continuity diagnostics of the associated smart storage tank 502.

A hydrogen storage controller 506 is communicatively coupled to the smart tank controllers 504 via an on-board communication network 508, such as through a controller area network (CAN). The hydrogen storage controller 506 receives one or more signals from a corresponding one of the smart tank controllers 504 associated with each of the plurality of smart storage tanks 502. In an example, the smart tank controller 504 may be configured to, periodically and/or upon a corresponding request from the hydrogen storage controller 506, transmit a signal indicative of a present pressure value, a present temperature value, a storage mass value, a present estimated storage mass value, a solenoid status of a solenoid of the smart storage tank 502, and/or a diagnostic bitmap of the smart storage tank 502. The hydrogen storage controller 506 processes each received signal and communicates the combined information to another element, such as a supervisory controller 512.

The hydrogen storage controller 506 may be configured to detect an additional smart tank. Furthermore, a maximum number of hydrogen storage tanks connectable the hydrogen storage controller is increased, because each smart storage tank needs only a communication connection to the hydrogen storage controller 506.

FIG. 6 illustrates an example process 600 for detecting a number of hydrogen storage tanks 402 connected to the hydrogen storage controller 404. In an example, the process 600 may be executed by the hydrogen storage controller, such as the hydrogen storage controller 404 described in reference to at least FIG. 4. Of course, in other examples, the process 600 may be wholly or partly executed by a different controller or several controllers.

The process 600 may begin at block 602, where the hydrogen storage controller 404 receives a signal indicating a total number (TST) of the hydrogen storage tanks 402 that are connected to the hydrogen storage controller 404. At block 604, the hydrogen storage controller 404 determines whether a command for detecting a status of all storage tank terminals of the hydrogen storage controller 404 has been received. The hydrogen storage controller 404 indicates that an error occurred in receiving a command to detect a status of all storage tank terminals and ends or exits the process 600 if the command has not been received.

In response to receiving a command to detect a status of all storage tank terminals of the hydrogen storage controller 404, the hydrogen storage controller 404, at block 606, may wait a predefined period (of time) to ensure that all sensors and drives have completed a corresponding wake up routine. The hydrogen storage controller 404, at block 606, sets a tank under test (TUT) variable to one. At block 608, the hydrogen storage controller 404 issues a command to open a solenoid valve of the first hydrogen storage tank 402-1, such as by energizing the solenoid drive connector terminal 314-1 of the first hydrogen storage tank 402-1. During the command, the hydrogen storage controller 404 monitors current at the I-MON feedback connector terminal 406-1 of the first hydrogen storage tank 402-1.

At block 610, the hydrogen storage controller 404 determines whether current value detected at the I-MON feedback connector terminal 406-1 of the first hydrogen storage tank 402-1 is greater than a predefined threshold current. If the current value is less than the threshold current, then the hydrogen storage controller 404, at block 612, sets a status of the first hydrogen storage tank 402-1 to ABSENT, e.g., by setting a PowerDown variable value to ABSENT.

In response to the current value being greater than the threshold current, the hydrogen storage controller 404, at block 614, sets a status of the first hydrogen storage tank 402-1 to PRESENT, e.g., by setting a PowerDown variable value to PRESENT. At block 616, the hydrogen storage controller 404 updates a consolidated tank status bitmap based on the status of the first hydrogen storage tank 402-1. The hydrogen storage controller 404 at block 618 waits a predefined debounce period before proceeding to block 620 where the hydrogen storage controller 404 determines whether the status of the total number (TST) of the hydrogen storage tanks 402 has been determined. If the number of hydrogen storage tanks whose status has been determined is less than the total number (TST), the hydrogen storage controller 404 returns to block 608 where it issues a command to open a solenoid valve of a next hydrogen storage tank 402, such as by energizing the solenoid drive connector terminal 314 of the next hydrogen storage tank 402. The hydrogen storage controller 404 then repeats operations of blocks 608 through 620.

In response to the number of hydrogen storage tanks whose status has been determined being greater than or equal to the total number (TST), the hydrogen storage controller 404 sends, to the supervisory controller 408, corresponding statuses of the hydrogen storage tanks 402, e.g., by sending the tank status bitmap. The process 600 may then end. In other embodiments, the process 600 may be repeated in response to receiving a total number of the hydrogen storage tanks that may be connected to the hydrogen storage controller 404 or in response to a different signal or command.

Figure 7:
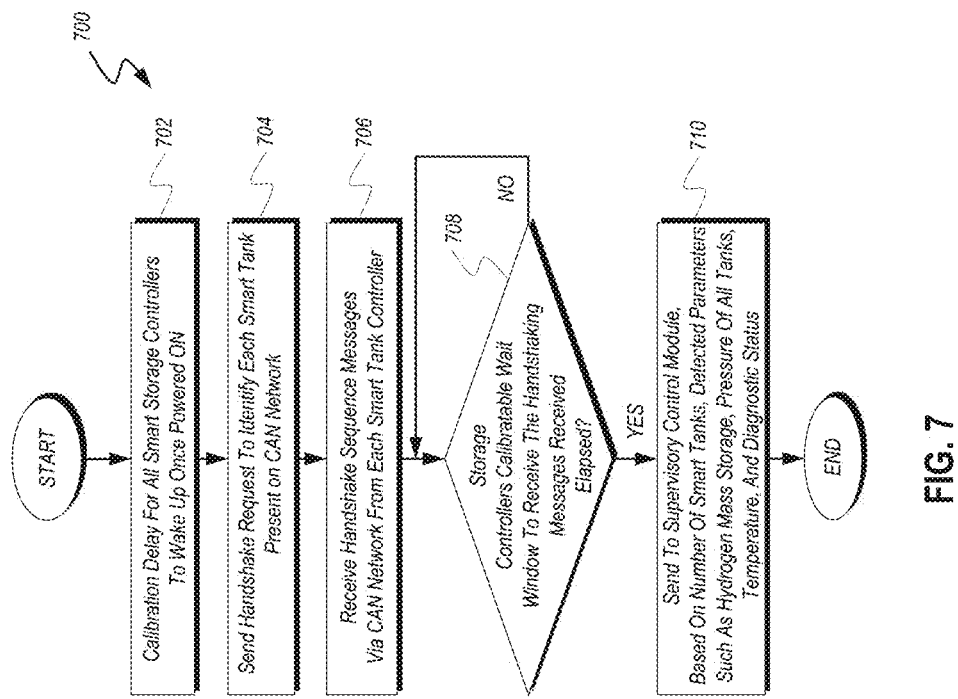
FIG. 7 is a block diagram illustrating an example process flow for establishing communication between the smart tank controller and the hydrogen storage controller.

FIG. 7 illustrates an example process 700 for communicating with the smart storage tanks 502. In an example, the process 700 may be executed by the hydrogen storage controller, such as the hydrogen storage controller 506 described in reference to at least FIG. 5. Of course, in other examples, the process 700 may be wholly or partly executed by a different controller or several controllers.

As shown, the process 700 begins at block 702, where the hydrogen storage controller 506 detects that the hydrogen storage system has been powered on. The hydrogen storage controller 506 waits a predetermined period to permit the corresponding smart storage controllers 504 of the smart storage tanks 502 to wake up. At block 704, the hydrogen storage controller 506 sends, using an on-board communication network, a handshake request to all smart storage controller 504 connected thereto.

At block 706, the hydrogen storage controller 506 receives the handshake signals from the smart storage controllers 504. At block 708, the hydrogen storage controller 506 determines whether a predefined period for receiving the handshake signals has elapsed. If the predefined period has not elapsed, the hydrogen storage controller 506 returns to block 708.

In response to detecting that the predefined period has elapsed, the hydrogen storage controller 506, at block 710, sends a signal to the supervisory controller 512 indicative of operating parameters of each of the smart storage tanks 502. For example, the hydrogen storage controller 506 may send a signal indicating a number of smart storage tanks 502 connected to the hydrogen storage controller 506, and/or a present pressure of each smart storage tank 502, a present temperature of each smart storage tank 502, a storage mass of each smart storage tank 502, a present estimated storage mass of each smart storage tank 502, a solenoid status of a solenoid of each smart storage tank 502, and a diagnostic bitmap of each smart storage tank 502. Furthermore, the hydrogen storage controller 506 may transmit one or more signals indicating a total storage mass capacity of the vehicle and/or average temperature and pressure values, and so on.

The process 700 may then end. In other embodiments, the process 700 may be repeated in response to detecting that the hydrogen storage system has been powered up or in response to a different signal or command.

Figure 8:
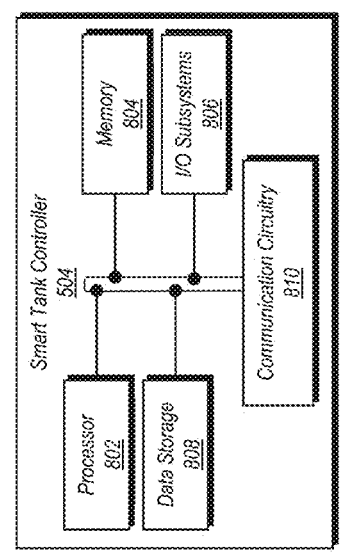
FIG. 8 is a block diagram illustrating an example implementation of the smart tank controller of FIG. 5.

FIG. 8 illustrates an example implementation 800 of the smart tank controller 504. While the illustrated implementation 800 describes only the smart tank controller 504, in other examples, the hydrogen storage controller 506 and the supervisory controller 512 may be embodied to include similar components configured to perform similar operations to those described, with respect to the smart tank controller 504. The smart tank controller 504 includes one or more processors 802, memory 804, an I/O subsystem 806, one or more data storage devices 808, and communication circuitry 810. It will be appreciated that the smart tank controller 504 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The processor 802 may be embodied as any type of device or collection of devices capable of performing the described various compute functions. In some embodiments, the processor 802 may be embodied as a single device, such as an integrated circuit, an embedded system, a field-programmable gate array (FPGA), a system-on-a-chip (SOC), an application-specific integrated circuit (ASIC), reconfigurable hardware or hardware circuitry, or other specialized hardware to facilitate performance of the functions described herein. As another example, the processor 802 may be embodied as one or more single-core processors, one or more multi-core processors, a digital signal processor, a microcontroller, or other processor or processing/controlling circuit(s).

The memory 804 may be embodied as any type of volatile (e.g., dynamic random access memory (DRAM), etc.) or non-volatile memory or data storage capable of performing the described functions. It will be appreciated that the memory 804 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as DRAM or static random access memory (SRAM).

The processor 802 of the smart tank controller 504 is communicatively coupled to other components of the control system of the smart storage tank 502 via the I/O subsystem 806, which may be embodied as circuitry and/or components to facilitate input/output operations with the processor 802, the memory 804, and other components of the smart tank controller 504 and/or the smart storage tank 502. For example, the I/O subsystem 806 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 806 may form a portion of a system-on-a-chip (SoC) and be incorporated, along with the processor 802 and the memory 804 and/or other components of the smart tank controller 504, on a single integrated circuit chip.

The one or more data storage devices 808 may be embodied as any type of storage device(s) configured for short-term or long-term storage of data, such as, for example, memory devices and circuits, memory cards, hard disk drives, solid-state drives, or other data storage devices. Each data storage device 808 may include a system partition that stores data and firmware code for the data storage device 808. Each data storage device 808 may also include an operating system partition that stores data files and executables for an operating system.

The communication circuitry 810 may be embodied as any communication circuit, device, or collection thereof, capable of enabling communications between the processor 802 and other computing devices, such as the control system and the hydrogen storage controller 506, as well as any network communication enabling devices, such as a gateway, an access point, other network switches/routers, etc., to allow ingress/egress of network traffic. Accordingly, the communication circuitry 810 may be configured to use any one or more communication technologies (e.g., wireless or wired communication technologies) and associated protocols (e.g., CAN, Ethernet, Bluetooth®, Wi-Fi®, WiMAX, LTE, 5G, etc.) to effect such communication.

It should be appreciated that, in some embodiments, the communication circuitry 810 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the processor 802, etc.), performing computational functions, etc.

In some embodiments, performance of one or more of the functions of the described communication circuitry 810 may be performed by specialized circuitry, hardware, or combination thereof of the communication circuitry 810, which may be embodied as a system-on-a-chip (SoC) or otherwise form a portion of a SoC of the processor 802, the memory 804, and/or other components of the smart tank controller 504. Alternatively, the specialized circuitry, hardware, or combination thereof may be embodied as one or more discrete processing units of the smart tank controller 504, each of which may be capable of performing one or more of the described functions.

The following numbered embodiments are contemplated and are non-limiting.

1. A hydrogen storage tank of a vehicle, the hydrogen storage tank comprising:
   a housing defining an inlet/outlet opening;
   a control assembly extending into the housing through the opening and comprising a plurality of sensors; and
   a controller configured to receive signals from the plurality of sensors, the controller configured to:
   in response to a request for a handshake signal, initiate sending the handshake signal, and
   in response to the vehicle being started, initiate periodically sending data indicating parameter values received from the plurality of sensors.
2. The hydrogen storage tank of clause 1, any other suitable clause, or any combination of suitable clauses, wherein the plurality of sensors include at least one of a pressure sensor and a temperature sensor.
3. The hydrogen storage tank of clause 1, any other suitable clause, or any combination of suitable clauses, wherein the data further indicates at least one of a storage tank identifier, a storage tank type, a storage mass of the storage tank, a present storage value of the storage tank, a tank solenoid status of a solenoid of the storage tank, and a diagnostic bitmap of the storage tank.
4. The hydrogen storage tank of clause 1, any other suitable clause, or any combination of suitable clauses, wherein the controller is a smart tank controller, and wherein the request is received from a hydrogen storage controller communicatively coupled thereto.
5. The hydrogen storage tank of clause 4, any other suitable clause, or any combination of suitable clauses, wherein the smart tank controller and the hydrogen storage controller communicate using a controller area network (CAN).
6. The hydrogen storage tank of clause 5, any other suitable clause, or any combination of suitable clauses, wherein the CAN is an on-board communication network.
7. The hydrogen storage tank of clause 4, any other suitable clause, or any combination of suitable clauses, wherein the hydrogen storage controller is communicatively connected to a corresponding one of a plurality of smart tank controllers associated with each of a plurality of hydrogen storage tanks of the vehicle.
8. The hydrogen storage tank of clause 7, any other suitable clause, or any combination of suitable clauses, wherein the plurality of hydrogen storage tanks comprises one hydrogen storage tank.
9. The hydrogen storage tank of clause 7, any other suitable clause, or any combination of suitable clauses, wherein the plurality of hydrogen storage tanks comprises two hydrogen storage tanks.
10. The hydrogen storage tank of clause 7, any other suitable clause, or any combination of suitable clauses, wherein the plurality of hydrogen storage tanks comprises three hydrogen storage tanks.
11. The hydrogen storage tank of clause 7, any other suitable clause, or any combination of suitable clauses, wherein the plurality of hydrogen storage tanks comprises four hydrogen storage tanks.
12. The hydrogen storage tank of clause 7, any other suitable clause, or any combination of suitable clauses, wherein the plurality of hydrogen storage tanks comprises five hydrogen storage tanks.
13. The hydrogen storage tank of clause 7, any other suitable clause, or any combination of suitable clauses, wherein additional wiring is disposed between each of the plurality of hydrogen storage tanks and the hydrogen storage controller.
14. The hydrogen storage tank of clause 13, any other suitable clause, or any combination of suitable clauses, wherein the additional wiring drives signals from the hydrogen storage controller to a solenoid valve.
15. The hydrogen storage tank of clause 7, any other suitable clause, or any combination of suitable clauses, wherein calibration software of the hydrogen storage controller is updated in response to removing any one of the plurality of hydrogen storage tanks.
16. The hydrogen storage tank of clause 7, any other suitable clause, or any combination of suitable clauses, wherein the hydrogen storage controller identifies a plurality of connected hydrogen storage tanks.
17. The hydrogen storage tank of clause 16, any other suitable clause, or any combination of suitable clauses, wherein the identification is based on a current feedback signal received from a solenoid drive of each of the hydrogen storage tanks.
18. The hydrogen storage tank of clause 7, any other suitable clause, or any combination of suitable clauses, wherein the hydrogen storage controller issues the sequential commands in response to a request to determine a number of hydrogen storage tanks connected.
19. The hydrogen storage tank of clause 18, any other suitable clause, or any combination of suitable clauses, wherein the request to determine the number of connected hydrogen storage tanks may be activated by a service technician.
20. The hydrogen storage tank of clause 18, any other suitable clause, or any combination of suitable clauses, wherein the request to determine the number of connected hydrogen storage tanks may be activated by a service tool.
21. The hydrogen storage tank of clause 18, any other suitable clause, or any combination of suitable clauses, wherein the request to determine the number of connected hydrogen storage tanks may be activated by other possibilities.
22. The hydrogen storage tank of clause 4, any other suitable clause, or any combination of suitable clauses, wherein the hydrogen storage controller is configured to monitor a current output of a solenoid of a hydrogen storage tank
23. The hydrogen storage tank of clause 22, any other suitable clause, or any combination of suitable clauses, wherein the hydrogen storage tank includes a current output terminal electronically and communicatively coupled to a corresponding terminal of the hydrogen storage controller.
24. The hydrogen storage tank of clause 4, any other suitable clause, or any combination of suitable clauses, wherein the smart tank controller is configured to provide at least one drive signal and perform hydrogen storage tank diagnostics.
25. The hydrogen storage tank of clause 4, any other suitable clause, or any combination of suitable clauses, wherein the hydrogen storage controller comprises a current control switch 26. The hydrogen storage tank of clause 25, any other suitable clause, or any combination of suitable clauses, wherein the current control switch is configured to activate and deactivate a solenoid valve
27. The hydrogen storage tank of clause 4, any other suitable clause, or any combination of suitable clauses, wherein the hydrogen storage controller transmits a signal to activate a solenoid valve of the hydrogen storage tank.
28. The hydrogen storage tank of clause 4, any other suitable clause, or any combination of suitable clauses, wherein the hydrogen storage controller energizes a solenoid valve drive terminal of the hydrogen storage tank.
29. The hydrogen storage tank of clause 4, any other suitable clause, or any combination of suitable clauses, wherein the hydrogen storage controller may be communicatively coupled to a supervisory controller.
30. The hydrogen storage tank of clause 29, any other suitable clause, or any combination of suitable clauses, wherein the hydrogen storage controller transmits detected hydrogen storage capacity values of each of the hydrogen storage tanks
31. The hydrogen storage tank of clause 29, any other suitable clause, or any combination of suitable clauses, wherein the hydrogen storage controller transmits a total hydrogen storage capacity value available.
32. The hydrogen storage tank of clause 4, any other suitable clause, or any combination of suitable clauses, wherein the hydrogen storage controller may be configured to transmit detected hydrogen storage capacity values.
33. The hydrogen storage tank of clause 4, any other suitable clause, or any combination of suitable clauses, wherein the hydrogen storage controller is configured to determine a total hydrogen storage capacity of the hydrogen storage tanks.
34. The hydrogen storage tank of clause 33, any other suitable clause, or any combination of suitable clauses, wherein the total hydrogen storage capacity is determined by an equation.
35. The hydrogen storage tank of clause 34, any other suitable clause, or any combination of suitable clauses, wherein the equation is Total_Hydrogen_Storage_Capacity=N*M.
36. The hydrogen storage tank of clause 4, any other suitable clause, or any combination of suitable clauses, wherein an on-board communication network acts to communicatively couple the hydrogen storage controller and the smart tank controllers.
37. The hydrogen storage tank of clause 36, any other suitable clause, or any combination of suitable clauses, wherein the hydrogen storage controller receives one or more signals from a corresponding one or more of the smart tank controllers.
38. The hydrogen storage tank of clause 37, any other suitable clause, or any combination of suitable clauses, wherein the hydrogen storage controller processes the signal.
39. The hydrogen storage tank of clause 37, any other suitable clause, or any combination of suitable clauses, wherein the hydrogen storage controller communicates to a supervisory controller.
40. The hydrogen storage tank of clause 36, any other suitable clause, or any combination of suitable clauses, wherein the smart tank controller is configured to transmit a signal indicative of a present pressure value.
41. The hydrogen storage tank of clause 36, any other suitable clause, or any combination of suitable clauses, wherein the smart tank controller is configured to transmit a present temperature value.
42. The hydrogen storage tank of clause 36, any other suitable clause, or any combination of suitable clauses, wherein the smart tank controller is configured to transmit a storage mass value.
43. The hydrogen storage tank of clause 36, any other suitable clause, or any combination of suitable clauses, wherein the smart tank controller is configured to transmit a present estimated storage mass value.
44. The hydrogen storage tank of clause 36, any other suitable clause, or any combination of suitable clauses, wherein the smart tank controller is configured to transmit a solenoid status of a solenoid of the smart storage tank.
45. The hydrogen storage tank of clause 36, any other suitable clause, or any combination of suitable clauses, wherein the smart tank controller is configured to transmit a diagnostic bitmap of the smart storage tank.
46. The hydrogen storage tank of clause 36, any other suitable clause, or any combination of suitable clauses, wherein the hydrogen storage controller is configured to detect an additional smart tank.
47. The hydrogen storage tank of clause 36, any other suitable clause, or any combination of suitable clauses, wherein the hydrogen storage controller is connected to a plurality of hydrogen storage tanks.
48. The hydrogen storage tank of clause 1, any other suitable clause, or any combination of suitable clauses, wherein the housing is cylindrical.
49. The hydrogen storage tank of clause 1, any other suitable clause, or any combination of suitable clauses, wherein the housing is rectangular.
50. The hydrogen storage tank of clause 1, any other suitable clause, or any combination of suitable clauses, wherein the housing is circular.
51. The hydrogen storage tank of clause 1, any other suitable clause, or any combination of suitable clauses, wherein the housing is not cylindrical.
52. The hydrogen storage tank of clause 1, any other suitable clause, or any combination of suitable clauses, wherein the housing is any shape.
53. The hydrogen storage tank of clause 1, any other suitable clause, or any combination of suitable clauses, wherein the hydrogen storage tank has a hydrogen storage capacity.
54. The hydrogen storage tank of clause 53, any other suitable clause, or any combination of suitable clauses, wherein the hydrogen storage capacity equals a hydrogen storage capacity of one or more other hydrogen storage tanks.
55. The hydrogen storage tank of clause 53, any other suitable clause, or any combination of suitable clauses, wherein the hydrogen storage capacity is different than a hydrogen storage capacity of one or more other hydrogen storage tanks.
56. The hydrogen storage tank of clause 1, any other suitable clause, or any combination of suitable clauses, wherein the hydrogen storage tank receives a fuel.
57. The hydrogen storage tank of clause 56, any other suitable clause, or any combination of suitable clauses, wherein the fuel is received through a high pressure circuit 58. The hydrogen storage tank of clause 56, any other suitable clause, or any combination of suitable clauses, wherein the fuel is received through a check valve 59. The hydrogen storage tank of clause 56, any other suitable clause, or any combination of suitable clauses, wherein the fuel is received through a high pressure circuit and a check valve.

60. The hydrogen storage tank of clause 59, any other suitable clause, or any combination of suitable clauses, wherein the check valve is configured to prevent backflow.

61. The hydrogen storage tank of clause 1, any other suitable clause, or any combination of suitable clauses, a high pressure regulator extends into the hydrogen storage tank.

62. The hydrogen storage tank of clause 61, any other suitable clause, or any combination of suitable clauses, wherein the high pressure regulator is configured to direct a flow of hydrogen out of the hydrogen storage tank.

63. The hydrogen storage tank of clause 61, any other suitable clause, or any combination of suitable clauses, wherein the high pressure regulator is configured to reduce a pressure of a gas flowing out of the hydrogen storage tank.

64. The hydrogen storage tank of clause 1, any other suitable clause, or any combination of suitable clauses, wherein the signals are provided by pressure and temperature transducers.

65. The hydrogen storage tank of clause 64, any other suitable clause, or any combination of suitable clauses, wherein the pressure and temperature transducers control a solenoid valve 66. The hydrogen storage tank of clause 65, any other suitable clause, or any combination of suitable clauses, wherein the solenoid valve shuts off flow from the hydrogen storage tank when the pressure goes below a predetermined level.

67. The hydrogen storage tank of clause 65, any other suitable clause, or any combination of suitable clauses, wherein the solenoid valve is an excess flow shut off valve.

68. The hydrogen storage tank of clause 67, any other suitable clause, or any combination of suitable clauses, wherein the excess flow shut off valve shuts off a flow of gas when pressure exceeds a predefined threshold.

69. The hydrogen storage tank of clause 65, any other suitable clause, or any combination of suitable clauses, wherein the solenoid valve controls a gas flow from the hydrogen storage tank to a fuel cell.

70. The hydrogen storage tank of clause 65, any other suitable clause, or any combination of suitable clauses, wherein the solenoid valve is closed unless electronically activated.

71. The hydrogen storage tank of clause 1, any other suitable clause, or any combination of suitable clauses, wherein the signals indicate a pressure and a temperature of a gas in the hydrogen storage tank.

72. The hydrogen storage tank of clause 1, any other suitable clause, or any combination of suitable clauses, wherein the hydrogen storage tank comprises input or output terminals.

73. The hydrogen storage tank of clause 72, any other suitable clause, or any combination of suitable clauses, wherein the terminals comprise a temperature sensor.

74. The hydrogen storage tank of clause 72, any other suitable clause, or any combination of suitable clauses, wherein the terminals comprise a pressure transducer.

75. The hydrogen storage tank of clause 72, any other suitable clause, or any combination of suitable clauses, wherein the terminals comprise a solenoid drive.

76. The hydrogen storage tank of clause 72, any other suitable clause, or any combination of suitable clauses, wherein the terminals comprise a solenoid return connect.

77. The hydrogen storage tank of clause 1, any other suitable clause, or any combination of suitable clauses, wherein the hydrogen storage controller issues a command to turn on a solenoid.

78. The hydrogen storage tank of clause 77, any other suitable clause, or any combination of suitable clauses, wherein the hydrogen storage controller simultaneously monitors and records a current feedback signal from the solenoid valve of the hydrogen storage tank to determine a presence or absence of the tank.

79. The hydrogen storage tank of clause 77, any other suitable clause, or any combination of suitable clauses, wherein the hydrogen storage controller determines whether the hydrogen storage tank s present.

80. The hydrogen storage tank of clause 77, any other suitable clause, or any combination of suitable clauses, wherein the hydrogen storage controller determines whether the hydrogen storage tank is connected to the hydrogen storage controller.

81. The hydrogen storage tank of clause 77, any other suitable clause, or any combination of suitable clauses, wherein the hydrogen storage controller determines whether the hydrogen storage tank is disconnected from the hydrogen storage controller.

82. The hydrogen storage tank of clause 77, any other suitable clause, or any combination of suitable clauses, wherein the hydrogen storage controller issues a command to turn ON the solenoid of a first hydrogen storage tank.

83. The hydrogen storage tank of clause 77, any other suitable clause, or any combination of suitable clauses, wherein the hydrogen storage controller analyzes recorded current readings to determine whether the hydrogen storage tank is connected.

84. The hydrogen storage tank of clause 77, any other suitable clause, or any combination of suitable clauses, wherein the hydrogen storage controller updates a state of a PowerDown variable associated with the tank to a corresponding state.

85. The hydrogen storage tank of clause 84, any other suitable clause, or any combination of suitable clauses, wherein the hydrogen storage controller uses the PowerDown variable to disable related controls and drives for one or more terminal sets determined not to have a connected hydrogen storage tank.

86. The hydrogen storage tank of clause 84, any other suitable clause, or any combination of suitable clauses, wherein the corresponding state is present.

87. The hydrogen storage tank of clause 86, any other suitable clause, or any combination of suitable clauses, wherein the hydrogen storage controller provides one or more operating parameters to the supervisory controller for the hydrogen storage tanks having a present state.

88. The hydrogen storage tank of clause 87, any other suitable clause, or any combination of suitable clauses, wherein the one or more operating parameters is a total (cumulative) mass.
89. The hydrogen storage tank of clause 87, any other suitable clause, or any combination of suitable clauses, wherein the one or more operating parameters is an individual storage mass.
90. The hydrogen storage tank of clause 87, any other suitable clause, or any combination of suitable clauses, wherein the one or more operating parameters is a pressure of each of the tanks having a present state.
91. The hydrogen storage tank of clause 87, any other suitable clause, or any combination of suitable clauses, wherein the one or more operating parameters is a temperature value of the tanks having a present state.
92. The hydrogen storage tank of clause 87, any other suitable clause, or any combination of suitable clauses, wherein the one or more operating parameters is a status of a corresponding solenoid of each of the hydrogen storage tanks.
93. The hydrogen storage tank of clause 84, any other suitable clause, or any combination of suitable clauses, wherein a corresponding state is absent.
94. The hydrogen storage tank of clause 93, any other suitable clause, or any combination of suitable clauses, wherein the hydrogen storage controller is configured to mask on-board diagnostic (OBD) faults reported by one or more terminals sets having an absent state.
95. The hydrogen storage tank of clause 1, any other suitable clause, or any combination of suitable clauses, wherein the hydrogen storage tank is at least one smart storage tank.
96. The hydrogen storage tank of clause 95, any other suitable clause, or any combination of suitable clauses, wherein a first smart storage tank is communicatively coupled to a first smart tank controller.
97. The hydrogen storage tank of clause 96, any other suitable clause, or any combination of suitable clauses, wherein the smart tank controller comprises a processor.
98. The hydrogen storage tank of clause 97, any other suitable clause, or any combination of suitable clauses, wherein the processor is a single device.
99. The hydrogen storage tank of clause 98, any other suitable clause, or any combination of suitable clauses, wherein the single device is an integrated circuit.
100. The hydrogen storage tank of clause 98, any other suitable clause, or any combination of suitable clauses, wherein the single device is an embedded system.
101. The hydrogen storage tank of clause 98, any other suitable clause, or any combination of suitable clauses, wherein the single device is a field-programmable gate array (FPGA).
102. The hydrogen storage tank of clause 98, any other suitable clause, or any combination of suitable clauses, wherein the single device is a system-on-a-chip (SOC).
103. The hydrogen storage tank of clause 98, any other suitable clause, or any combination of suitable clauses, wherein the single device is an application-specific integrated circuit (ASIC).
104. The hydrogen storage tank of clause 98, any other suitable clause, or any combination of suitable clauses, wherein the single device is reconfigurable hardware.
105. The hydrogen storage tank of clause 98, any other suitable clause, or any combination of suitable clauses, wherein the single device is hardware circuitry.
106. The hydrogen storage tank of clause 98, any other suitable clause, or any combination of suitable clauses, wherein the single device is specialized hardware.
107. The hydrogen storage tank of clause 97, any other suitable clause, or any combination of suitable clauses, wherein the processor is a one or more single-core processors.
108. The hydrogen storage tank of clause 97, any other suitable clause, or any combination of suitable clauses, wherein the processor is one or more multi-core processors.
109. The hydrogen storage tank of clause 97, any other suitable clause, or any combination of suitable clauses, wherein the processor is a digital signal processor.
110. The hydrogen storage tank of clause 97, any other suitable clause, or any combination of suitable clauses, wherein the processor is a microcontroller.
111. The hydrogen storage tank of clause 97, any other suitable clause, or any combination of suitable clauses, wherein the processor is a controlling circuit.
112. The hydrogen storage tank of clause 96, any other suitable clause, or any combination of suitable clauses, wherein the smart tank controller comprises a memory.
113. The hydrogen storage tank of clause 112, any other suitable clause, or any combination of suitable clauses, wherein the memory is volatile.
114. The hydrogen storage tank of clause 113, any other suitable clause, or any combination of suitable clauses, wherein the volatile is dynamic random access memory (DRAM).
115. The hydrogen storage tank of clause 113, any other suitable clause, or any combination of suitable clauses, wherein the volatile is a storage medium that requires power to maintain the state of data stored by the medium.
116. The hydrogen storage tank of clause 113, any other suitable clause, or any combination of suitable clauses, wherein the volatile is random access memory (RAM).
117. The hydrogen storage tank of clause 113, any other suitable clause, or any combination of suitable clauses, wherein the volatile is static random access memory (SRAM).
118. The hydrogen storage tank of clause 112, any other suitable clause, or any combination of suitable clauses, wherein the memory is non-volatile.
119. The hydrogen storage tank of clause 112, any other suitable clause, or any combination of suitable clauses, wherein the memory is data storage capable of performing the described functions.
120. The hydrogen storage tank of clause 112, any other suitable clause, or any combination of suitable clauses, wherein the memory comprises main memory.
121. The hydrogen storage tank of clause 112, any other suitable clause, or any combination of suitable clauses, wherein the memory comprises cache memory.
122. The hydrogen storage tank of clause 96, any other suitable clause, or any combination of suitable clauses, wherein the smart tank controller comprises data storage devices.
123. The hydrogen storage tank of clause 122, any other suitable clause, or any combination of suitable clauses, wherein the data storage devices are configured for short-term or long-term storage of data.
124. The hydrogen storage tank of clause 122, any other suitable clause, or any combination of suitable clauses, wherein the data storage devices are memory devices and circuits.

125. The hydrogen storage tank of clause 122, any other suitable clause, or any combination of suitable clauses, wherein the data storage devices are memory cards.
126. The hydrogen storage tank of clause 122, any other suitable clause, or any combination of suitable clauses, wherein the data storage devices are hard disk drives.
127. The hydrogen storage tank of clause 122, any other suitable clause, or any combination of suitable clauses, wherein the data storage devices are solid-state drives.
128. The hydrogen storage tank of clause 122, any other suitable clause, or any combination of suitable clauses, wherein the data storage devices are other data storage devices.
129. The hydrogen storage tank of clause 122, any other suitable clause, or any combination of suitable clauses, wherein the data storage devices comprise a system partition that stores data and firmware code for the data storage device.
130. The hydrogen storage tank of clause 122, any other suitable clause, or any combination of suitable clauses, wherein the data storage devices comprise an operating system partition that stores data files and executables for an operating system.
131. The hydrogen storage tank of clause 96, any other suitable clause, or any combination of suitable clauses, wherein the smart tank controller comprises an I/O subsystem.
132. The hydrogen storage tank of clause 131, any other suitable clause, or any combination of suitable clauses, wherein the I/O subsystem is circuitry.
133. The hydrogen storage tank of clause 131, any other suitable clause, or any combination of suitable clauses, wherein the I/O subsystem facilitates input/output operations with the processor, the memory, and other components of the smart tank controller or the smart storage tank.
134. The hydrogen storage tank of clause 131, any other suitable clause, or any combination of suitable clauses, wherein the I/O subsystem is memory controller hubs.
135. The hydrogen storage tank of clause 131, any other suitable clause, or any combination of suitable clauses, wherein the I/O subsystem is input/output control hubs.
136. The hydrogen storage tank of clause 131, any other suitable clause, or any combination of suitable clauses, wherein the I/O subsystem is integrated sensor hubs.
137. The hydrogen storage tank of clause 131, any other suitable clause, or any combination of suitable clauses, wherein the I/O subsystem is firmware devices.
138. The hydrogen storage tank of clause 131, any other suitable clause, or any combination of suitable clauses, wherein the I/O subsystem is communication links.
139. The hydrogen storage tank of clause 138, any other suitable clause, or any combination of suitable clauses, wherein the communication links are point-to-point links.
140. The hydrogen storage tank of clause 138, any other suitable clause, or any combination of suitable clauses, wherein the communication links are bus links.
141. The hydrogen storage tank of clause 138, any other suitable clause, or any combination of suitable clauses, wherein the communication links are wires.
142. The hydrogen storage tank of clause 138, any other suitable clause, or any combination of suitable clauses, wherein the communication links are cables.
143. The hydrogen storage tank of clause 138, any other suitable clause, or any combination of suitable clauses, wherein the communication links are light guides.
144. The hydrogen storage tank of clause 138, any other suitable clause, or any combination of suitable clauses, wherein the communication links are printed circuit board traces.
145. The hydrogen storage tank of clause 131, any other suitable clause, or any combination of suitable clauses, wherein the I/O subsystem is comprised by a portion of a system-on-a-chip (SoC).
146. The hydrogen storage tank of clause 131, any other suitable clause, or any combination of suitable clauses, wherein the I/O subsystem is incorporated on a single integrated circuit chip.
147. The hydrogen storage tank of clause 146, any other suitable clause, or any combination of suitable clauses, wherein the single integrated circuit chip further incorporates a processor, a memory, and other components of the smart tank controller.
148. The hydrogen storage tank of clause 96, any other suitable clause, or any combination of suitable clauses, wherein the smart tank controller comprises communication circuitry.
149. The hydrogen storage tank of clause 148, any other suitable clause, or any combination of suitable clauses, wherein the communication circuitry is any communication circuit, device, or collection thereof, capable of enabling communications between the processor and other computing devices.
150. The hydrogen storage tank of clause 148, any other suitable clause, or any combination of suitable clauses, wherein the communication circuitry is any communication circuit, device, or collection thereof, capable of enabling communications between any network communication enabling devices.
151. The hydrogen storage tank of clause 150, any other suitable clause, or any combination of suitable clauses, wherein the network communication enabling devices comprises a gateway.
152. The hydrogen storage tank of clause 150, any other suitable clause, or any combination of suitable clauses, wherein the network communication enabling devices comprises an access point.
153. The hydrogen storage tank of clause 150, any other suitable clause, or any combination of suitable clauses, wherein the network communication enabling devices comprises other network switches.
154. The hydrogen storage tank of clause 150, any other suitable clause, or any combination of suitable clauses, wherein the network communication enabling devices comprises routers.
155. The hydrogen storage tank of clause 148, any other suitable clause, or any combination of suitable clauses, wherein the communication circuitry is configured to use any one or more communication technologies.
156. The hydrogen storage tank of clause 155, any other suitable clause, or any combination of suitable clauses, wherein the one or more communication technologies is wireless.
157. The hydrogen storage tank of clause 155, any other suitable clause, or any combination of suitable clauses, wherein one or more communication technologies is wired.
158. The hydrogen storage tank of clause 148, any other suitable clause, or any combination of suitable clauses, wherein the communication circuitry is configured to use associated protocols.

159. The hydrogen storage tank of clause 158, any other suitable clause, or any combination of suitable clauses, wherein the associated protocols is CAN.
160. The hydrogen storage tank of clause 158, any other suitable clause, or any combination of suitable clauses, wherein the associated protocols is Ethernet.
161. The hydrogen storage tank of clause 158, any other suitable clause, or any combination of suitable clauses, wherein the associated protocols is Bluetooth®.
162. The hydrogen storage tank of clause 158, any other suitable clause, or any combination of suitable clauses, wherein the associated protocols is Wi-Fi®.
163. The hydrogen storage tank of clause 158, any other suitable clause, or any combination of suitable clauses, wherein the associated protocols is WiMAX.
164. The hydrogen storage tank of clause 158, any other suitable clause, or any combination of suitable clauses, wherein the associated protocols is LTE, 5G.
165. The hydrogen storage tank of clause 148, any other suitable clause, or any combination of suitable clauses, wherein the communication circuitry is specialized circuitry, hardware, or combination thereof to perform pipeline logic.
166. The hydrogen storage tank of clause 165, any other suitable clause, or any combination of suitable clauses, wherein the specialized circuitry, hardware, or combination thereof is a system-on-a-chip (SoC).
167. The hydrogen storage tank of clause 165, any other suitable clause, or any combination of suitable clauses, wherein the specialized circuitry, hardware, or combination thereof is one or more discrete processing units of the smart tank controller.
168. The hydrogen storage tank of clause 96, any other suitable clause, or any combination of suitable clauses, wherein the smart tank controller comprises other components.
169. The hydrogen storage tank of clause 168, any other suitable clause, or any combination of suitable clauses, wherein the other components comprises one or more additional components.
170. The hydrogen storage tank of clause 96, any other suitable clause, or any combination of suitable clauses, wherein the smart tank controller is configured to store a storage tank identifier of the smart storage tank and a storage tank type of the smart storage tank.
171. The hydrogen storage tank of clause 96, any other suitable clause, or any combination of suitable clauses, wherein the smart tank controller is configured to monitor and control operation of the corresponding smart storage tank.
172. The hydrogen storage tank of clause 171, any other suitable clause, or any combination of suitable clauses, wherein the operation is a present pressure of the smart storage tank a present temperature of the smart storage tank, a storage mass of the smart storage tank, a present estimated storage mass of the smart storage tank, a solenoid status of a solenoid of the smart storage tank, and a diagnostic bitmap of the smart storage tank.
173. The hydrogen storage tank of clause 96, any other suitable clause, or any combination of suitable clauses, wherein the smart tank controller is configured to perform circuit continuity diagnostics of the associated smart storage tank.
174. A method for a vehicle comprising:
   in response to a handshake request, by a controller of the vehicle, initiating sending a handshake signal, the controller communicatively coupled to a control system of a hydrogen storage tank, and the control system comprising a plurality of sensors; and
   in response to a status request, initiating periodically sending data indicating parameter values received from the plurality of sensors.
175. The method of clause 174, any other suitable clause, or any combination of suitable clauses, wherein the plurality of sensors include at least one of a pressure sensor and a temperature sensor.
176. The method of clause 174, any other suitable clause, or any combination of suitable clauses, wherein the data further indicates at least one of a storage tank identifier, a storage tank type, a storage mass of the storage tank, a present storage value of the storage tank, a tank solenoid status of a solenoid of the storage tank, and a diagnostic bitmap of the storage tank.
177. The method of clause 174, any other suitable clause, or any combination of suitable clauses, wherein the controller is a smart tank controller, and wherein the request is received from a hydrogen storage controller communicatively coupled thereto.
178. The method of clause 177, any other suitable clause, or any combination of suitable clauses, wherein the smart tank controller and the hydrogen storage controller communicate using a controller area network (CAN).
179. The method of clause 177, any other suitable clause, or any combination of suitable clauses, wherein the hydrogen storage controller is communicatively connected to a corresponding one of a plurality of smart tank controllers associated with each of a plurality of hydrogen storage tanks of the vehicle.
180. A vehicle comprising:
   a plurality of hydrogen storage tanks, each storage tank including a plurality of sensors;
   a smart tank controller associated with each of the plurality of hydrogen storage tanks, each smart tank controller communicatively coupled to the plurality of sensors of the hydrogen storage tank associated with the smart storage controller; and
   a hydrogen storage controller communicatively connected to each of the plurality of smart tank controllers and configured to send a handshake request thereto, wherein the hydrogen storage controller determines a total available hydrogen capacity value of the vehicle based on a number of the hydrogen storage tanks connected to an on-board communication network and capacity of each of the connected hydrogen storage tanks, and wherein the number of the connected hydrogen storage tanks corresponds to a number of handshake signals received in response to the request.
181. The vehicle of clause 180, any other suitable clause, or any combination of suitable clauses, wherein the hydrogen storage controller is further configured to, in response to failing to receive the handshake signal from one of the plurality of smart tank controllers, reduce a total available hydrogen capacity value by a capacity amount of the hydrogen storage tank associated with the smart tank controller.
182. The vehicle of clause 180, any other suitable clause, or any combination of suitable clauses, wherein the hydrogen storage controller is further configured to, in response to receiving an additional handshake signal from an additional one of the plurality of smart tank controllers, increase a total available hydrogen capacity value by a capacity amount of the hydrogen storage tank associated with the additional smart tank controller.

183. The vehicle of clause 180, any other suitable clause, or any combination of suitable clauses, wherein the plurality of sensors include at least one of a pressure sensor and a temperature sensor.

184. The vehicle of clause 180, any other suitable clause, or any combination of suitable clauses, wherein the on-board communication network comprises a controller area network (CAN).

185. The vehicle of clause 180, any other suitable clause, or any combination of suitable clauses, wherein the hydrogen storage controller determines the capacity of each of the connected hydrogen storage tanks based on data received from the corresponding smart tank controllers associated with each of the connected hydrogen storage tanks.

186. The vehicle of clause 185, any other suitable clause, or any combination of suitable clauses, wherein the data further indicates at least one of a storage tank identifier, a storage tank type, a storage mass of the storage tank, a present storage value of the storage tank, a tank solenoid status of a solenoid of the storage tank, and a diagnostic bitmap of the storage tank.

187. The vehicle of clause 180, any other suitable clause, or any combination of suitable clauses, a supervisory controller communicatively coupled to the hydrogen storage controller, wherein the hydrogen storage controller is further configured to transmit the total available hydrogen capacity value of the vehicle to the supervisory controller, and wherein the supervisory controller adapts operation of the vehicle based on the value.

188. The vehicle of clause 180, any other suitable clause, or any combination of suitable clauses, wherein the plurality of hydrogen storage tanks comprises one hydrogen storage tank.

189. The vehicle of clause 180, any other suitable clause, or any combination of suitable clauses, wherein the plurality of hydrogen storage tanks comprises two hydrogen storage tanks.

190. The vehicle of clause 180, any other suitable clause, or any combination of suitable clauses, wherein the plurality of hydrogen storage tanks comprises three hydrogen storage tanks.

191. The vehicle of clause 180, any other suitable clause, or any combination of suitable clauses, wherein the plurality of hydrogen storage tanks comprises four hydrogen storage tanks.

192. The vehicle of clause 180, any other suitable clause, or any combination of suitable clauses, wherein the plurality of hydrogen storage tanks comprises five hydrogen storage tanks.

193. The vehicle of clause 180, any other suitable clause, or any combination of suitable clauses, wherein calibration software of the hydrogen storage controller is updated in response to removing any one of the plurality of hydrogen storage tanks.

194. The vehicle of clause 180, any other suitable clause, or any combination of suitable clauses, wherein the hydrogen storage tank is at least one smart storage tank.

195. The vehicle of clause 194, any other suitable clause, or any combination of suitable clauses, wherein a first smart storage tank is communicatively coupled to a first smart tank controller.

196. The vehicle of clause 195, any other suitable clause, or any combination of suitable clauses, wherein the smart tank controller comprises a processor.

197. The vehicle of clause 196, any other suitable clause, or any combination of suitable clauses, wherein the processor is a single device.

198. The vehicle of clause 197, any other suitable clause, or any combination of suitable clauses, wherein the single device is an integrated circuit.

199. The vehicle of clause 197, any other suitable clause, or any combination of suitable clauses, wherein the single device is an embedded system.

200. The vehicle of clause 197, any other suitable clause, or any combination of suitable clauses, wherein the single device is a field-programmable gate array (FPGA).

201. The vehicle of clause 197, any other suitable clause, or any combination of suitable clauses, wherein the single device is a system-on-a-chip (SOC).

202. The vehicle of clause 197, any other suitable clause, or any combination of suitable clauses, wherein the single device is an application-specific integrated circuit (ASIC).

203. The vehicle of clause 197, any other suitable clause, or any combination of suitable clauses, wherein the single device is reconfigurable hardware.

204. The vehicle of clause 197, any other suitable clause, or any combination of suitable clauses, wherein the single device is hardware circuitry.

205. The vehicle of clause 197, any other suitable clause, or any combination of suitable clauses, wherein the single device is specialized hardware.

206. The vehicle of clause 196, any other suitable clause, or any combination of suitable clauses, wherein the processor is a one or more single-core processors.

207. The vehicle of clause 196, any other suitable clause, or any combination of suitable clauses, wherein the processor is one or more multi-core processors.

208. The vehicle of clause 196, any other suitable clause, or any combination of suitable clauses, wherein the processor is a digital signal processor.

209. The vehicle of clause 196, any other suitable clause, or any combination of suitable clauses, wherein the processor is a microcontroller.

210. The vehicle of clause 196, any other suitable clause, or any combination of suitable clauses, wherein the processor is a controlling circuit.

211. The vehicle of clause 195, any other suitable clause, or any combination of suitable clauses, wherein the smart tank controller comprises a memory.

212. The vehicle of clause 211, any other suitable clause, or any combination of suitable clauses, wherein the memory is volatile.

213. The vehicle of clause 212, any other suitable clause, or any combination of suitable clauses, wherein the volatile is dynamic random access memory (DRAM).

214. The vehicle of clause 212, any other suitable clause, or any combination of suitable clauses, wherein the volatile is a storage medium that requires power to maintain the state of data stored by the medium.

215. The vehicle of clause 212, any other suitable clause, or any combination of suitable clauses, wherein the volatile is random access memory (RAM).

216. The vehicle of clause 212, any other suitable clause, or any combination of suitable clauses, wherein the volatile is static random access memory (SRAM).

217. The vehicle of clause 211, any other suitable clause, or any combination of suitable clauses, wherein the memory is non-volatile.
218. The vehicle of clause 211, any other suitable clause, or any combination of suitable clauses, wherein the memory is data storage capable of performing the described functions.
219. The vehicle of clause 211, any other suitable clause, or any combination of suitable clauses, wherein the memory comprises main memory.
220. The vehicle of clause 211, any other suitable clause, or any combination of suitable clauses, wherein the memory comprises cache memory.
221. The vehicle of clause 195, any other suitable clause, or any combination of suitable clauses, wherein the smart tank controller comprises data storage devices.
222. The vehicle of clause 221, any other suitable clause, or any combination of suitable clauses, wherein the data storage devices are configured for short-term or long-term storage of data.
223. The vehicle of clause 221, any other suitable clause, or any combination of suitable clauses, wherein the data storage devices are memory devices and circuits.
224. The vehicle of clause 221, any other suitable clause, or any combination of suitable clauses, wherein the data storage devices are memory cards.
225. The vehicle of clause 221, any other suitable clause, or any combination of suitable clauses, wherein the data storage devices are hard disk drives.
226. The vehicle of clause 221, any other suitable clause, or any combination of suitable clauses, wherein the data storage devices are solid-state drives.
227. The vehicle of clause 221, any other suitable clause, or any combination of suitable clauses, wherein the data storage devices are other data storage devices.
228. The vehicle of clause 221, any other suitable clause, or any combination of suitable clauses, wherein the data storage devices comprise a system partition that stores data and firmware code for the data storage device.
229. The vehicle of clause 221, any other suitable clause, or any combination of suitable clauses, wherein the data storage devices comprise an operating system partition that stores data files and executables for an operating system.
230. The vehicle of clause 195, any other suitable clause, or any combination of suitable clauses, wherein the smart tank controller comprises an I/O subsystem.
231. The vehicle of clause 230, any other suitable clause, or any combination of suitable clauses, wherein the I/O subsystem is circuitry.
232. The vehicle of clause 230, any other suitable clause, or any combination of suitable clauses, wherein the I/O subsystem facilitates input/output operations with the processor, the memory, and other components of the smart tank controller or the smart storage tank.
233. The vehicle of clause 230, any other suitable clause, or any combination of suitable clauses, wherein the I/O subsystem is memory controller hubs.
234. The vehicle of clause 230, any other suitable clause, or any combination of suitable clauses, wherein the I/O subsystem is input/output control hubs.
235. The vehicle of clause 230, any other suitable clause, or any combination of suitable clauses, wherein the I/O subsystem is integrated sensor hubs.
236. The vehicle of clause 230, any other suitable clause, or any combination of suitable clauses, wherein the I/O subsystem is firmware devices.
237. The vehicle of clause 230, any other suitable clause, or any combination of suitable clauses, wherein the I/O subsystem is communication links.
238. The vehicle of clause 237, any other suitable clause, or any combination of suitable clauses, wherein the communication links are point-to-point links.
239. The vehicle of clause 237, any other suitable clause, or any combination of suitable clauses, wherein the communication links are bus links.
240. The vehicle of clause 237, any other suitable clause, or any combination of suitable clauses, wherein the communication links are wires.
241. The vehicle of clause 237, any other suitable clause, or any combination of suitable clauses, wherein the communication links are cables.
242. The vehicle of clause 237, any other suitable clause, or any combination of suitable clauses, wherein the communication links are light guides.
243. The vehicle of clause 237, any other suitable clause, or any combination of suitable clauses, wherein the communication links are printed circuit board traces.
244. The vehicle of clause 230, any other suitable clause, or any combination of suitable clauses, wherein the I/O subsystem is comprised by a portion of a system-on-a-chip (SoC).
245. The vehicle of clause 230, any other suitable clause, or any combination of suitable clauses, wherein the I/O subsystem is incorporated on a single integrated circuit chip.
246. The vehicle of clause 245, any other suitable clause, or any combination of suitable clauses, wherein the single integrated circuit chip further incorporates a processor, a memory, and other components of the smart tank controller.
247. The vehicle of clause 195, any other suitable clause, or any combination of suitable clauses, wherein the smart tank controller comprises communication circuitry.
248. The vehicle of clause 247, any other suitable clause, or any combination of suitable clauses, wherein the communication circuitry is any communication circuit, device, or collection thereof, capable of enabling communications between the processor and other computing devices.
249. The vehicle of clause 247, any other suitable clause, or any combination of suitable clauses, wherein the communication circuitry is any communication circuit, device, or collection thereof, capable of enabling communications between any network communication enabling devices.
250. The vehicle of clause 249, any other suitable clause, or any combination of suitable clauses, wherein the network communication enabling devices comprises a gateway.
251. The vehicle of clause 249, any other suitable clause, or any combination of suitable clauses, wherein the network communication enabling devices comprises an access point.
252. The vehicle of clause 249, any other suitable clause, or any combination of suitable clauses, wherein the network communication enabling devices comprises other network switches.

253. The vehicle of clause 249, any other suitable clause, or any combination of suitable clauses, wherein the network communication enabling devices comprises routers.
254. The vehicle of clause 247, any other suitable clause, or any combination of suitable clauses, wherein the communication circuitry is configured to use any one or more communication technologies.
255. The vehicle of clause 254, any other suitable clause, or any combination of suitable clauses, wherein the one or more communication technologies is wireless.
256. The vehicle of clause 254, any other suitable clause, or any combination of suitable clauses, wherein one or more communication technologies is wired.
257. The vehicle of clause 247, any other suitable clause, or any combination of suitable clauses, wherein the communication circuitry is configured to use associated protocols.
258. The vehicle of clause 257, any other suitable clause, or any combination of suitable clauses, wherein the associated protocols is CAN.
259. The vehicle of clause 257, any other suitable clause, or any combination of suitable clauses, wherein the associated protocols is Ethernet.
260. The vehicle of clause 257, any other suitable clause, or any combination of suitable clauses, wherein the associated protocols is Bluetooth®.
261. The vehicle of clause 257, any other suitable clause, or any combination of suitable clauses, wherein the associated protocols is Wi-Fi®.
262. The vehicle of clause 257, any other suitable clause, or any combination of suitable clauses, wherein the associated protocols is WiMAX.
263. The vehicle of clause 257, any other suitable clause, or any combination of suitable clauses, wherein the associated protocols is LTE, 5G.
264. The vehicle of clause 247, any other suitable clause, or any combination of suitable clauses, wherein the communication circuitry is specialized circuitry, hardware, or combination thereof to perform pipeline logic.
265. The vehicle of clause 264, any other suitable clause, or any combination of suitable clauses, wherein the specialized circuitry, hardware, or combination thereof is a system-on-a-chip (SoC).
266. The vehicle of clause 264, any other suitable clause, or any combination of suitable clauses, wherein the specialized circuitry, hardware, or combination thereof is one or more discrete processing units of the smart tank controller.
267. The vehicle of clause 195, any other suitable clause, or any combination of suitable clauses, wherein the smart tank controller comprises other components.
268. The vehicle of clause 267, any other suitable clause, or any combination of suitable clauses, wherein the other components comprises one or more additional components.
269. The vehicle of clause 195, any other suitable clause, or any combination of suitable clauses, wherein the smart tank controller is configured to store a storage tank identifier of the smart storage tank and a storage tank type of the smart storage tank.
270. The vehicle of clause 195, any other suitable clause, or any combination of suitable clauses, wherein the smart tank controller is configured to monitor and control operation of the corresponding smart storage tank.
271. The vehicle of clause 270, any other suitable clause, or any combination of suitable clauses, wherein the operation is a present pressure of the smart storage tank a present temperature of the smart storage tank, a storage mass of the smart storage tank, a present estimated storage mass of the smart storage tank, a solenoid status of a solenoid of the smart storage tank, and a diagnostic bitmap of the smart storage tank.
272. The vehicle of clause 195, any other suitable clause, or any combination of suitable clauses, wherein the smart tank controller is configured to perform circuit continuity diagnostics of the associated smart storage tank.
273. A system for a vehicle comprising:
    a hydrogen storage controller comprising a solenoid valve drive terminal and a current monitoring terminal, the terminals configured to electrically and communicatively couple the controller to a control system of a hydrogen storage tank, the hydrogen storage controller configured to:
    in response to a request to determine a total available hydrogen capacity value of the vehicle, energize the solenoid valve drive terminal and monitor, during the energizing, current flow at the current monitoring terminal,
    determine the total available hydrogen capacity value of the vehicle based on the current flow, and
    cause the vehicle to be operated based on the determined the total available hydrogen capacity value.
274. The system of clause 273, any other suitable clause, or any combination of suitable clauses, wherein to determine the total available hydrogen capacity value based on the current flow comprises:
    in response to the current flow being greater than a predefined threshold, determine that the hydrogen storage tank is present and add capacity of the hydrogen storage tank to the total available hydrogen capacity value, and
    in response to the current flow being less than a predefined threshold, determine that the hydrogen storage tank is absent and prevent adding capacity of the hydrogen storage tank to the total available hydrogen capacity value.
275. The system of clause 273, any other suitable clause, or any combination of suitable clauses, wherein a supervisory controller communicatively coupled to the hydrogen storage controller and configured to receive the total available hydrogen capacity value therefrom, wherein the supervisory controller is configured to control propulsion of the vehicle based on the received total available hydrogen capacity value.
276. The system of clause 275, any other suitable clause, or any combination of suitable clauses, wherein the supervisory controller is communicatively coupled to the hydrogen storage controller using an on-board controller area network (CAN).
277. The system of clause 273, any other suitable clause, or any combination of suitable clauses, wherein the solenoid valve drive terminal is a first solenoid valve terminal and the current monitoring terminal is a first current monitoring terminal,
    wherein the hydrogen storage controller further comprises a second solenoid valve terminal and a second current monitoring terminal, each configured to electrically and communicatively couple the controller to a corresponding control system of a second hydrogen storage tank, and wherein, upon determining the total available hydrogen capacity value based on the first current flow at the first current monitoring terminal, the hydrogen storage controller energizes the second solenoid valve drive terminal and monitors, during the energizing, a second current flow at the second current monitoring terminal, and updates the total available hydrogen capacity value by adding capacity of the second hydrogen storage tank based on the second current flow.

278. The system of clause 273, any other suitable clause, or any combination of suitable clauses, wherein the control system comprises a plurality of sensors.

279. The system of clause 278, any other suitable clause, or any combination of suitable clauses, wherein the plurality of sensors include at least one of a pressure sensor and a temperature sensor.

280. The system of clause 278, any other suitable clause, or any combination of suitable clauses, wherein the hydrogen storage controller further comprises terminals to receive data from at least one of the plurality of sensors.

281. The system of clause 273, any other suitable clause, or any combination of suitable clauses, wherein the hydrogen storage controller further comprises a solenoid valve return terminal configured to connect to a corresponding solenoid valve return terminal of the control system.

282. The system of clause 281, any other suitable clause, or any combination of suitable clauses, wherein the hydrogen storage controller is further configured to activate and deactivate the hydrogen storage tank by selectively energizing and de-energizing the solenoid valve drive terminal.

283. A method for communicating with smart storage tanks, the method comprising the steps of:
a hydrogen storage controller detecting that a hydrogen storage system has been powered on;
the hydrogen storage controller waiting a predetermined period to permit a corresponding smart storage controller of the smart storage tanks to wake up;
the hydrogen storage controller sending a handshake request signal to the corresponding smart storage controller connected thereto;
the hydrogen storage controller receiving the handshake request signal from the smart storage controllers;
the hydrogen storage controller determining whether a predefined period for receiving the handshake request signals has elapsed;
if the predefined period has not elapsed, the hydrogen storage controller returning to determining whether a predefined period for receiving the handshake request signals has elapsed;
if the predefined period has lapsed, the hydrogen storage controller sending a signal to a supervisory controller indicative of operating parameters.

284. The method for communicating with smart storage tanks of clause 283, any other suitable clause, or any combination of suitable clauses, wherein the method is executed by the hydrogen storage controller.

285. The method for communicating with smart storage tanks of clause 283, any other suitable clause, or any combination of suitable clauses, wherein the method is executed by several controllers.

286. The method for communicating with smart storage tanks of clause 283, any other suitable clause, or any combination of suitable clauses, wherein the method is not executed by the hydrogen storage controller.

287. The method for communicating with smart storage tanks of clause 283, any other suitable clause, or any combination of suitable clauses, wherein the method is repeated in response to detecting that the hydrogen storage system has been powered up or in response to a different signal or command.

288. The method for communicating with smart storage tanks of clause 283, any other suitable clause, or any combination of suitable clauses, wherein sending includes identifying a number of smart storage tanks connected to the hydrogen storage controller.

289. The method for communicating with smart storage tanks of clause 283, any other suitable clause, or any combination of suitable clauses, wherein sending includes a present pressure of each smart storage tank.

290. The method for communicating with smart storage tanks of clause 283, any other suitable clause, or any combination of suitable clauses, wherein sending includes a present temperature of each smart storage tank.

291. The method for communicating with smart storage tanks of clause 283, any other suitable clause, or any combination of suitable clauses, wherein sending includes a storage mass of each smart storage tank.

292. The method for communicating with smart storage tanks of clause 283, any other suitable clause, or any combination of suitable clauses, wherein sending includes a present estimated storage mass of each smart storage tank.

293. The method for communicating with smart storage tanks of clause 283, any other suitable clause, or any combination of suitable clauses, wherein sending includes a solenoid status of a solenoid of each smart storage tank.

294. The method for communicating with smart storage tanks of clause 283, any other suitable clause, or any combination of suitable clauses, wherein sending includes a diagnostic bitmap of each smart storage tank.

295. The method for communicating with smart storage tanks of clause 283, any other suitable clause, or any combination of suitable clauses, wherein sending includes a total storage mass capacity of the vehicle and average temperature and pressure values.

296. A method for detecting a number of hydrogen storage tanks connected to a hydrogen storage controller, the method comprising the steps of:
a hydrogen storage controller receiving a signal indicating a total number (TST) of hydrogen storage tanks that are connected to the hydrogen storage controller;
the hydrogen storage controller determining whether a command for detecting a status of all storage tank terminals of the hydrogen storage controller has been received;
the hydrogen storage controller exiting the method if the command has not been received;
the hydrogen storage controller not exiting the method in response to receiving a command to detect a status of all storage tank terminals of the hydrogen storage controller;
the hydrogen storage controller waiting a predefined period to ensure that all sensors and drives have completed a corresponding wake up routine;

the hydrogen storage controller setting a tank under a test (TUT) variable to one;

the hydrogen storage controller issuing a command to open a solenoid valve of a first hydrogen storage tank;

during the command, the hydrogen storage controller monitoring a current at a I-MON feedback connector terminal of the first hydrogen storage tank;

the hydrogen storage controller determining whether a current value detected at the I-MON feedback connector terminal of the first hydrogen storage tank is greater than a predefined threshold;

if the current value is less than the predefined threshold, the hydrogen storage controller setting a status of the first hydrogen storage tank to absent;

if the current value is greater than the predefined threshold, the hydrogen storage controller setting a status of the first hydrogen storage tank to present;

the hydrogen storage controller updating a consolidated tank status bitmap based on the status of the first hydrogen storage tank;

the hydrogen storage controller waiting a predefined debounce period;

the hydrogen storage controller determining whether the status of the total number (TST) of the hydrogen storage tanks has been determined;

if the number of hydrogen storage tanks whose status has been determined is less than the total number (TST), the hydrogen storage controller returning to issuing a command to open a solenoid valve of a next hydrogen storage tank;

the hydrogen storage controller repeating the steps of issuing a command to open a solenoid valve of a first hydrogen storage tank through returning to issuing a command to open a solenoid valve of a next hydrogen storage tank; and if the number of hydrogen storage tanks whose status has been determined is greater than or equal to the total number (TST), the hydrogen storage controller sending to the supervisory controller corresponding statuses of the hydrogen storage tanks, wherein sending comprises sending the tank status bitmap.

297. The method for detecting a number of hydrogen storage tanks connected to a hydrogen storage controller of clause 296, any other suitable clause, or any combination of suitable clauses, wherein the method is executed by the hydrogen storage controller.

298. The method for detecting a number of hydrogen storage tanks connected to a hydrogen storage controller of clause 296, any other suitable clause, or any combination of suitable clauses, wherein the method is executed by several controllers.

299. The method for detecting a number of hydrogen storage tanks connected to a hydrogen storage controller of clause 296, any other suitable clause, or any combination of suitable clauses, wherein the method is not executed by the hydrogen storage controller.

300. The method for detecting a number of hydrogen storage tanks connected to a hydrogen storage controller of clause 296, any other suitable clause, or any combination of suitable clauses, wherein the method is repeated in response to receiving a total number of the hydrogen storage tanks that may be connected to the hydrogen storage controller.

301. The method for detecting a number of hydrogen storage tanks connected to a hydrogen storage controller of clause 296, any other suitable clause, or any combination of suitable clauses, wherein the method is repeated in response to a different signal or command.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps. The term "comprising," as used herein in the present disclosure, may be interchanged, substituted, or replaced at any instance with the phrases "consisting essentially of" or "consisting of" and embody the relevant meanings and limitations associated with those terms or phrases as described herein.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

What is claimed is:

1. A hydrogen storage tank of a vehicle, the hydrogen storage tank comprising:
    a housing defining an inlet/outlet opening;
    valve assembly extending into the housing through the inlet/outlet opening and comprising one or more sensors and a solenoid valve; and
    a smart tank controller configured to receive a signal from the one or more sensors and the solenoid valve, the smart tank controller configured to:
    in response to a request for a handshake signal from a hydrogen storage controller, initiate sending the handshake signal to the hydrogen storage controller; and
    in response to a vehicle start, initiate periodically sending data indicating a parameter value received from the one or more sensors and the solenoid valve.

2. The hydrogen storage tank of claim 1, wherein the one or more sensors includes at least one of a pressure sensor or a temperature sensor.

3. The hydrogen storage tank of claim 1, wherein the data further indicates at least one of a storage tank identifier, a storage tank type, a storage mass of the storage tank, a present storage value of the storage tank, a tank solenoid status of the solenoid valve of the storage tank, or a diagnostic bitmap of the storage tank.

4. The hydrogen storage tank of claim 1, wherein the hydrogen storage controller communicatively coupled to the smart tank controller.

5. The hydrogen storage tank of claim 4, wherein the smart tank controller and the hydrogen storage controller communicate using a controller area network (CAN).

6. The hydrogen storage tank of claim 4, wherein the hydrogen storage controller is communicatively connected to a corresponding one of a plurality of smart tank controllers, each smart tank controller associated with one of a plurality of hydrogen storage tanks of the vehicle.

7. A method for controlling a hydrogen storage tank in a vehicle, the method comprising:
    in response to a handshake request, from a hydrogen storage controller, a smart tank controller initiating sending a handshake signal to the hydrogen storage controller, the hydrogen storage controller communicatively coupled to one or more sensors and a solenoid valve; and
    in response to a status request, the smart tank controller initiating periodically sending data indicating one or more parameter values received from the one or more sensors and the solenoid valve.

8. The method of claim 7, wherein the one or more sensors includes at least one of a pressure sensor and a temperature sensor.

9. The method of claim 7, wherein the data further indicates at least one of a storage tank identifier, a storage tank type, a storage mass of the storage tank, a present storage value of the storage tank, a tank solenoid status of the solenoid valve of the storage tank, and a diagnostic bitmap of the storage tank.

10. The method of claim 7, wherein the smart tank controller and the hydrogen storage controller communicate using a controller area network (CAN).

11. The method of claim 7, wherein the hydrogen storage controller is communicatively connected to a corresponding one of a plurality of smart tank controllers associated with each of a plurality of hydrogen storage tanks of the vehicle.

12. A hydrogen fueled vehicle comprising:
    a plurality of hydrogen storage tanks, each storage tank including one or more sensors and a solenoid valve;
    a smart tank controller associated with each hydrogen storage tank of the plurality of hydrogen storage tanks, each smart tank controller communicatively coupled to each sensor of the associated hydrogen storage tank and the solenoid valve; and
    a hydrogen storage controller communicatively coupled to each of the plurality of smart tank controllers and configured to send a handshake request thereto, wherein the hydrogen storage controller determines a total available hydrogen capacity value of the vehicle based on a number of the hydrogen storage tanks connected to an on-board communication network and capacity of each of the connected hydrogen storage tanks, and wherein the number of the connected hydrogen storage tanks corresponds to a number of handshake signals received in response to the request.

13. The vehicle of claim 12, wherein the hydrogen storage controller is further configured to, in response to failing to receive the handshake signal from one of the plurality of smart tank controllers, reduce a total available hydrogen capacity value by a capacity amount of the hydrogen storage tank associated with the smart tank controller.

14. The vehicle of claim 12, wherein the hydrogen storage controller is further configured to, in response to receiving an additional handshake signal from an additional one of the plurality of smart tank controllers, increase a total available hydrogen capacity value by a capacity amount of the hydrogen storage tank associated with the additional smart tank controller.

15. The vehicle of claim 12, wherein the plurality of sensors includes at least one of a pressure sensor or a temperature sensor.

16. The vehicle of claim 12, wherein the on-board communication network comprises a controller area network (CAN).

17. The vehicle of claim 12, wherein the hydrogen storage controller determines the capacity of each of the connected hydrogen storage tanks based on data received from the corresponding smart tank controllers associated with each of the connected hydrogen storage tanks.

18. The vehicle of claim 17, wherein the data further indicates at least one of a storage tank identifier, a storage tank type, a storage mass of the storage tank, a present storage value of the storage tank, a tank solenoid status of the solenoid valve of the storage tank, or a diagnostic bitmap of the storage tank.

19. The vehicle of claim 12, further comprising a supervisory controller communicatively coupled to the hydrogen storage controller, wherein the hydrogen storage controller is further configured to transmit the total available hydrogen capacity value of the vehicle to the supervisory controller, and wherein the supervisory controller adapts operation of the vehicle based on the total available hydrogen capacity value.

* * * * *